US006359036B1

(12) United States Patent
Tomotaki et al.

(10) Patent No.: US 6,359,036 B1
(45) Date of Patent: Mar. 19, 2002

(54) 1-AMINOPYRROLIDINE OR ITS SALT AS EPOXY RESIN HARDENER

(75) Inventors: Yoshihisa Tomotaki; Takashi Kitajima; Keiichiro Ishikawa; Akihiro Nabeshima; Tomohiro Furuichi, all of Tokushima (JP)

(73) Assignee: Otsuka Kagaku Kabushiki Kaisha, Osakafu (JP)

( * ) Notice: Subject to any disclaimer, the term of this patent is extended or adjusted under 35 U.S.C. 154(b) by 0 days.

(21) Appl. No.: 09/424,911
(22) PCT Filed: Apr. 28, 1999
(86) PCT No.: PCT/JP99/02274
§ 371 Date: Dec. 1, 1999
§ 102(e) Date: Dec. 1, 1999
(87) PCT Pub. No.: WO99/57171
PCT Pub. Date: Nov. 11, 1999

(30) Foreign Application Priority Data

Apr. 30, 1998 (JP) .......................... 10-137743

(51) Int. Cl.⁷ .................. C08G 59/50; C08K 3/20
(52) U.S. Cl. .................. 523/402; 525/454; 525/504; 525/523; 525/528

(58) Field of Search .................. 548/557; 528/117; 525/504, 523, 454, 528; 523/402

(56) References Cited

U.S. PATENT DOCUMENTS

| 3,671,473 A | 6/1972 | Sedor et al. ............ 260/18 PF |
| 4,564,677 A * | 1/1986 | Kantor ....................... 544/164 |
| 5,134,217 A | 7/1992 | Weider ........................ 528/53 |
| 5,688,905 A | 11/1997 | Walker ....................... 528/332 |

FOREIGN PATENT DOCUMENTS

| EP | 0 894 788 A | 2/1999 |
| GB | 884669 A | 12/1961 |
| GB | 1265163 A | 3/1972 |
| GB | 1022207 A | 3/1996 |
| SU | 1525151 A1 * | 11/1989 |

OTHER PUBLICATIONS

Jain et al., Proceedings of the Indian Academy of Sciences, Sci. Chem. (1985), vol. 95, No. 4, pp. 381–389.*

* cited by examiner

Primary Examiner—Robert E. L. Sellers
(74) Attorney, Agent, or Firm—Kubovcik & Kubovcik

(57) ABSTRACT

A curing agent for epoxy resin which comprises at least one selected from 1-aminopyrrolidine and its salt.

5 Claims, No Drawings

1-AMINOPYRROLIDINE OR ITS SALT AS EPOXY RESIN HARDENER

TECHNICAL FIELD

The present invention relates to a curing agent for epoxy resin.

A curing agent for epoxy resin of the invention can cure epoxy resin in a relatively short curing time at low temperatures in the range of 10° C. and below, especially, about 0° C. The curing agent is useful as, for example, a curing agent of epoxy resin adhesive for outdoor construction.

Epoxy resin is widely used as sealing material, coating composition, adhesive, etc, in a variety of fields such as electricity, electronics, and civil engineering and construction, because a cured product of epoxy resin has excellent electrical insulating properties, moisture proof, heat resistance, soldering resistance, chemical resistance, durability, adhesive property, and mechanical strength.

BACKGROUND ART

Conventionally, the curing of epoxy resin is carried out by adding a curing agent to epoxy resin, followed by heating. As typical representative examples of curing agent, there are, for example, diethylenetriamine, triethylenetetramine, isophoronediamine, diaminodiphenylmethane, diaminodiphenylsulfone, polyamides, dicyandiamide, hexahydrophthalic anhydride, methyltetrahydrophthalic anhydride, methyl nadic anhydride, novolac type phenol resin, tertiary amines, imidazoles, and amine complex of boron trifluoride.

Of these curing agents, ones which can cure epoxy resin at room temperature are amine curing agents such as diethylenetriamine, triethylenetetramine, polyamides, and tertiary amines. However, diethylenetriamine and triethylenetetramine require four days for curing, and polyamides and tertiary amines require seven days for curing. It is very difficult for other curing agents to be cured at room temperature, and they generally require a curing temperature of 80 to 200° C. and a curing time of 0.5 to 6 hours.

Meanwhile, an epoxy resin adhesive for outdoor construction is generally used in the field of civil engineering and construction. With a conventional curing agent, however, it is very difficult to cure epoxy resin without heating, as previously described. Even with one capable of curing, it takes an extremely long period of time, namely, four to seven days. Especially, for winter-season execution of works in which the outdoor temperature is often 10° C. and below, it is essential to initiate the curing reaction by heating.

Such characteristic of epoxy resin adhesive prolongs the period of execution of works in civil engineering and construction, which is also one of the causes of interfering with labor saving.

An object of the present invention is to provide a curing agent for epoxy resin which can rapidly cure epoxy resin at low temperatures in the range of near 0° C., especially, under −5 ° C.

DISCLOSURE OF THE INVENTION

The present invention provides a curing agent for epoxy resin which comprises at least one selected from 1-aminopyrrolidine and its salt, as an effective component.

The present invention also provides an epoxy resin cured with the above curing agent for epoxy resin.

The present invention also provides an adhesive composition for civil engineering and construction which contains the above curing agent for epoxy resin.

The present invention also provides an epoxy resin coating composition containing the above curing agent for epoxy resin.

A curing agent for epoxy resin of the invention is capable of curing epoxy resin at low temperatures of 10° C. and below, especially, near 0° C., and, in some instances, at extremely low temperatures in the range of near −20° C. Thus, when an epoxy resin adhesive for outdoor is used, for example, in civil engineering and construction, the adhesive can be cured without applying heat, by adding a curing agent for epoxy resin of the invention. This affords a great merit on working process.

It can be said that a curing agent for epoxy resin of the invention serves as a curing agent having an extremely short curing time, at ordinary temperature or higher, whereas it requires several hours for curing at low temperatures in the range of 10° C. and below, especially about 0° C., thereby having a moderate easy-to-use pot life.

A curing agent for epoxy resin of the invention comprises at least one selected from 1-aminopyrrolidine and its salt, as an effective component. Both 1-aminopyrrolidine and its salt are known compounds, and these are used as an intermediate for preparing chemicals or agricultural chemicals. Examples of the salt of 1-aminopyrrolidine are hydrochloride, sulfate and phosphate. Of these, 1-aminopyrrolidine itself can be used suitably.

Although 1-aminopyrrolidine and its salt can be added directly, in the form of powder, to epoxy resin, these are usually used in the form of an aqueous solution, organic solvent solution, or dispersion. Examples of organic solvent are lower alcohols such as methanol, ethanol and isopropanol; aromatic hydrocarbons such as toluene and xylene; aliphatic hydrocarbons such as hexane; ethers; polar solvent; and halogenated hydrocarbons. In addition, a solution of water and a suitable organic solvent or dispersion may be used. Of these various forms, an aqueous solution is preferred.

The amount of 1-aminopyrrolidine and its salt to be added to epoxy resin is not specifically limited. It may be suitably selected from a wide range, depending on various conditions such as the kind of epoxy resin, the kind and amount of other additives, the use of a cured product of epoxy resin to be obtained, and the curing conditions (the designed curing time and temperature, curing location, etc.). It is usually about 0.4 to 0.6 mole, preferably about 0.45 to 0.55 mole of 1-aminopyrrolidine or its salt, with respect to a single epoxy group of epoxy resin.

Conventional curing agent and curing accelerator can be added, as required, to a curing agent for epoxy resin of the invention insofar as its preferred characteristic is not impaired. As a curing agent, the same as the mentioned conventional ones are usable, and it is also possible to use dihydrazide compound, melamine, methylolmelamine, resol type compound, etc. As a curing accelerator, there are, for example, tertiary amines such as tri-n-butylamine, benzylmethylamine and 2,4,6-tris-(dimethylaminomethyl)phenol; and imidazoles such as 2-methylimidazole, 2-ethylimidazole, 2-ethyl-4-methylimidazole and 2-phenylimidazole. These conventional curing agents and curing accelerators can be used singly or in a combination of at least two of them.

Epoxy resin to which a curing agent for epoxy resin of the invention is applicable is not specifically limited, and it may be hitherto known one. Examples thereof are glycidyl ether type epoxy resin, glycidylamine type epoxy resin, cyclic aliphatic epoxy resin, glycidyl ester resin, heterocyclic epoxy resin, and urethane-modified epoxy resin.

Examples of glycidyl ether type epoxy resin are bisphenol A type, bisphenol F type, brominated bisphenol A type, hydrogenated bisphenol A type, bisphenol S type, bisphenol AF type, biphenyl type, naphthalene type, fluorene type, phenol novolac type, cresol novolac type, DPP novolac type, trifunctional type, tris(hydroxyphenyl)methane type, and tetraphenylolethane type epoxy resins.

Examples of glycidylamine type epoxy resin are tetraglycidyldiaminodiphenylmethane, triglycidyl isocyanurate, hydantoin type, 1,3-bis(N,N-diglycidylaminomethyl)cyclohexane, aminophenol type, aniline type, and toluidine type epoxy resins.

Examples of glycidyl ester type epoxy resin are hexahydrophthalate type and phthalate type epoxy resins.

To epoxy resin to which a curing agent for epoxy resin of the invention is applied, an inorganic filler and reinforcing agent can be added, as required, which have conventionally been added to epoxy resin. As an inorganic filler, any known ones are usable, and there are, for example, silica, fused quartz, calcium carbonate, barium carbonate, barium sulfate, alumina hydrate, alumina, magnesia hydrate, zircon, cordierite, silicon nitride, boron nitride, and aluminum nitride. As a reinforcing agent, any known ones are useable, and there are, for example, inorganic materials such as glass chop, asbestos, talc and mica; and inorganic fibers such as glass fiber, potassium titanate fiber, titanium dioxide fiber, wallastonite, xonotlite, and zinc silicate fiber. It is known that the thermal conductivity, cracking resistance, electrical property and tracking resistance of a cured product obtained are adjustable by suitably changing the kind, purity, and amount of a filler and reinforcing agent. Usually, it is suitable to add about 20 to 160 parts by weight of a filler and reinforcing agent, preferably about 50 to 120 parts by weight, based on 100 parts by weight of epoxy resin. Filler and reinforcing agent may be used singly or in a combination of at least two of them.

Further, to epoxy resin to which a curing agent for epoxy resin of the invention is applied, any additive that has conventionally been usually used as an additive of epoxy resin, may be added as required. Examples of such additives are inorganic pigment (particulate titanium dioxide, carbon black, red iron oxide, yellow iron oxide, etc.), organic pigment, viscosity adjusting agent, leveling agent, antifoamer, coupling agent, plasticizer, diluent, flame retardant, and organic solvent.

An epoxy resin containing a curing agent for epoxy resin of the invention (hereinafter referred to as "epoxy resin composition of the invention") is applicable to articles of various shape which comprises at least one selected from a variety of materials such as metal, synthetic resin, cement, ceramics, fibers and papers. Specifically, an article of various shape may be dipped in the epoxy resin composition of the invention, alternatively, the epoxy resin composition of the invention is applied or coated to the article surface, and then allowed to stand as it is, for curing. When heating this, the conditions of temperature and the like may be suitably selected depending on various conditions such as the kind of epoxy resin, the amount of 1-aminopyrrolidine and its salt, and, if added other additive, its kind and amount, and the use of a cured product of epoxy resin to be obtained. Usually, it is preferable to set to about 40 to 80° C.

Also, the epoxy resin composition of the invention can be formed into a shaped product of a desired shape, in accordance with the usual molding method, e.g., casting molding, and the shaped product can be attached to an article of various shape which comprises at least one of various materials, in accordance with the usual method, e.g., bonding and fitting. The curing conditions at the molding may be almost the same as in the case with application or dipping.

Also, the epoxy resin composition of the invention is suitably used as a structural adhesive, such as an adhesive for mutually bonding cured concrete parts or bonding to other building material, an adhesive for bonding an aged concrete plain to a new concrete plain, and an adhesive for bonding plate-like or honeycomb-like concrete parts having a cracking or dent.

Further, it is also suitably used as a structural filler which is injected into a narrow opening of a structure to fill the opening, an adhesive for civil engineering and construction, e.g., a structural filler which is injected into a wide gap part to fill the gap part, general-purpose coating composition, chemical resistant coating composition, coating composition for food processing facility, underwater coating composition, etc.

Additionally, one which is formed into a coating composition containing dressed aggregates by mixing a variety of aggregates, can be spread over an object, such as concrete, asphalt, steel and wood, alternatively, applied to the perpendiculars of concrete, stone building and wood, as well as ceiling.

BEST MODE OF CARRYING OUT THE INVENTION

The present invention will be described in more detail by the following examples.

EXAMPLE 1

To 10 g of bisphenol A type epoxy resin (trade name: Epikote828, epoxy equivalent: 190, manufactured by Yuka Shell Epoxy Co., Ltd.), 3.8 g of 60% by weight aqueous solution of 1-aminopyrrolidine (1-aminopyrrolidine: 0.0265 mole) was added and mixed to prepare an epoxy resin composition of the invention.

The epoxy resin composition was allowed to stand at 25° C. for 30 minutes, to obtain a colorless and transparent cured product.

EXAMPLE 2

About 3 g of an epoxy resin composition prepared in the same manner as Example 1, was weighed out with an aluminum cup. This was then placed in a constant temperature oven maintained at 40° C., and allowed to stand for 30 minutes, to obtain a colorless and transparent cured product.

EXAMPLE 3

In a beaker immersed in an ice bath, 10 g of bisphenol A type epoxy resin (Epikote828, epoxy equivalent: 190) and 3.8 g of 60% by weight aqueous solution of 1-aminopyrrolidine were mixed together to prepare an opaque epoxy resin composition of the invention. About 3 g of the obtained epoxy resincomposition was weighed out with an aluminum cup. This was then allowed to stand at 7° C., 0° C., and −23° C., to observe the cured state. Table 1 gives the results.

TABLE 1

| Curing temperature (° C.) | Curing time (hr) | | |
|---|---|---|---|
| | 5 | 8 | 24 |
| 7 | Cure | — | — |
| 0 | Increase in viscosity | Cure | — |
| −23 | Mixture turns to white ~ partially colorless | Increase in viscosity | Cure |

Table 1 shows that the curing agents for epoxy resin of the invention are capable of curing epoxy resin at extremely low temperatures in a practical curing time relatively shorter than that of a conventional curing agent.

INDUSTRIAL APPLICABILITY

In accordance with the present invention, it is possible to obtain a curing agent for epoxy resin which can rapidly cure epoxy resin even at low temperatures in the range of near 0° C., especially, under −5° C.

In addition, the curing agent for epoxy resin of the invention serves as a curing agent having an extremely short curing time at ordinary temperature or higher, whereas it requires several hours for curing at low temperatures in the range of 10° C. and below, especially about 0° C., showing that it has a moderate easy-to-use pot life.

What is claimed is:

1. An epoxy resin composition which consists essentially of an epoxy resin selected from the group consisting of glycidyl ether epoxy resins, glycidylamine epoxy resins, cyclic aliphatic epoxy resins, heterocyclic epoxy resins and urethane-modified epoxy resins and, as a curing agent for the epoxy resin, at least one compound selected from the group consisting of 1-aminopyrrolidine and its salt.

2. The epoxy resin composition of claim 1, wherein the composition is cured with the curing agent.

3. An adhesive composition for civil engineering and construction which comprises the epoxy resin composition of claim 1.

4. An epoxy resin coating composition which comprises the epoxy resin composition of claim 1.

5. An epoxy resin composition which consists essentially of an epoxy resin selected from the group consisting of glycidyl ether epoxy resins, glycidylamine epoxy resins, cyclic aliphatic epoxy resins, heterocyclic epoxy resins and urethanemodified epoxy resins, water, and, as a curing agent for the epoxy resin, at least one compound selected from the group consisting of 1-aminopyrrolidine and its salt.

* * * * *